(12) United States Patent
Shin

(10) Patent No.: US 7,336,826 B2
(45) Date of Patent: Feb. 26, 2008

(54) METHOD FOR FINDING OPTIMAL THRESHOLD FOR IMAGE SEGMENTATION

(75) Inventor: Yong-Shik Shin, Seoul (KR)

(73) Assignee: Pantech Co., Ltd. (KR)

( * ) Notice: Subject to any disclaimer, the term of this patent is extended or adjusted under 35 U.S.C. 154(b) by 733 days.

(21) Appl. No.: 10/817,551

(22) Filed: Apr. 2, 2004

(65) Prior Publication Data
US 2004/0208367 A1    Oct. 21, 2004

(30) Foreign Application Priority Data
Apr. 21, 2003    (KR) .................... 10-2003-0025048

(51) Int. Cl.
*G06K 9/34* (2006.01)
(52) U.S. Cl. ..................... 382/172; 382/173
(58) Field of Classification Search ............. None
See application file for complete search history.

(56) References Cited

U.S. PATENT DOCUMENTS

| 5,671,290 A | 9/1997 | Vaidyanathan |
| 5,734,747 A | 3/1998 | Vaidyanathan |

FOREIGN PATENT DOCUMENTS

| JP | 07-230549 | 8/1995 |
| JP | 08-235355 | 9/1996 |
| KR | 10-2001-0097053 | 11/2001 |

OTHER PUBLICATIONS

Sahoo et al. Threshold Selection using a Minimal Histogram Entropy Difference, Optical Engineering 36(7) Jul. 1997, pp. 1976-1981.*
Strang, Calculus, 1991, Wellesley-Cambridge Press, pp. 130-133.*
Shin, et al., "A fast method for finding the optimal threshold for image segmentation", Proceedings of KFIS 2001 Fall Conference,, pp. 109-112, 2001.
H. Maitre: "Le Traitement des images" 2003, Hermes Science Publication, Paris, pp. 29-32, Partial European Search Report Ref. No. XP-002371384.
Joe D. Hoffman: Numerical Methods for Engineers and Scientists: 2001, Marcel Dekker, Inc., New York, pp. 141-144, Partial European Search Report Ref. No. XP-022371385.
Xiping Luo, et al.: "ICM Method for Multi-Level Thresholding Using Maximum Entropy Criterion", Proceedings of ICIAP '99—10th International Conference on Image Analysis and Processing, Venice, Italy, Sep. 27, 1999, Partial European Search Report Ref. No. XP-002371391.

(Continued)

*Primary Examiner*—Brian Werner
*Assistant Examiner*—Thomas M Redding
(74) *Attorney, Agent, or Firm*—Knobbe Martens Olson & Bear LLP

(57) ABSTRACT

A method for finding the optimal threshold for image segmentation in image recognition is disclosed. The method includes the steps of: a) gaining histogram distribution of an image; b) computing entropy values corresponding to gray levels in the histogram; and c) gaining a minimum entropy value corresponding to the gray level as the threshold value by using a fixed point iteration FPI based on the computed entropy values.

3 Claims, 6 Drawing Sheets

OTHER PUBLICATIONS

Cheng H.D., et al.: "Threshold Selection Based on Fuzzy c-Partition Entropy Approach—A Tutorial" Pattern Recognition, Elsevier, Kidlington GB, vol. 31, No. 7, Jul. 31, 1998, pp. 857-870.

Kapur, J.N., et al.: "A New Method for Gray-Level Picture Thresholding Using the Entropy of the Histogram" Computer Vision Graphics and Image Processing, Academic Press, Duluth, MA, US, vol. 29, No. 3, Mar. 1, 1985, pp. 273-285.

Sahoo P.K., et al.: "Survey of Thresholding Techniques" Computer Vision Graphics and Image Processing, Academic Press, Duluth, MA, US, vol. 41, No. 2, Feb. 1, 1988, pp. 233-260.

* cited by examiner

METHOD FOR FINDING OPTIMAL THRESHOLD FOR IMAGE SEGMENTATION

FIELD OF THE INVENTION

The present invention relates to a method for finding a threshold for image segmentation; and, more particularly, to a method for finding the optimal threshold for image segmentation in image recognition.

DESCRIPTION OF RELATED ARTS

Generally, a process of finding the optimal threshold for the image segmentation is fundamental and important process in the imagerecognition. The process of recognition is necessary to distinguish an object from a background of an image.

The optimal threshold can be found easily based on a bimodal type histogram distribution graph and in above case, it is located at a lowest point of histogram distribution curve. There are many methods introduced for finding the optimal threshold.

A first method is stochastic method to find the optimal threshold. That is, a histogram distribution of an image is assumed as the bimodal type and a gray level having the minimum sum of variance is select as the optimal threshold. A second method finds the optimal threshold based on the Shannon entropy. A gray level having the minimum entropy is selected as the optimal threshold. There is also another method using fuzziness during computing entropy of image. This method selects a gray level having minimum fuzziness as the optimal threshold.

FIG. 1 is a flowchart explaining a conventional method for finding the optimal threshold. Referring to FIG. 1, at step S101, a histogram distribution of an image is computed. Entropies of all gray levels distributed in the histogram are computed at step S102. All computed entropies are compared one another and a gray level having the lowest entropy is selected at step 103. However, a process time of the conventional method is increased in proportion to a resolution of image and the number of entropies to be computed. Furthermore, in case of an image having multi thresholds, a condition of segmentation completion may not be computed by the conventional method.

SUMMARY OF THE INVENTION

It is, therefore, an object of the present invention to provide a method for effectively finding an optimal threshold for image segmentation of an image having multi thresholds by analyzing entropy characteristic of image based on a fixed point iteration and fuzzy entropy.

In accordance with an aspect of the present invention, there is provided a method for finding a threshold value in image segmentation, the method including the steps of: a) gaining histogram distribution of an image; b) computing entropy values corresponding to gray levels in the histogram; and c) gaining a minimum entropy value corresponding to the gray level as the threshold value by using a fixed point iteration FPI based on the computed entropy values.

BRIEF DESCRIPTION OF THE DRAWING(S)

The above and other objects and features of the present invention will become apparent from the following description of the preferred embodiments given in conjunction with the accompanying drawings, in which.

DETAILED DESCRIPTION OF THE INVENTION

Other objects and aspects of the invention will become apparent from the following description of the embodiments with reference to the accompanying drawings, which is set forth hereinafter.

Figure 1:
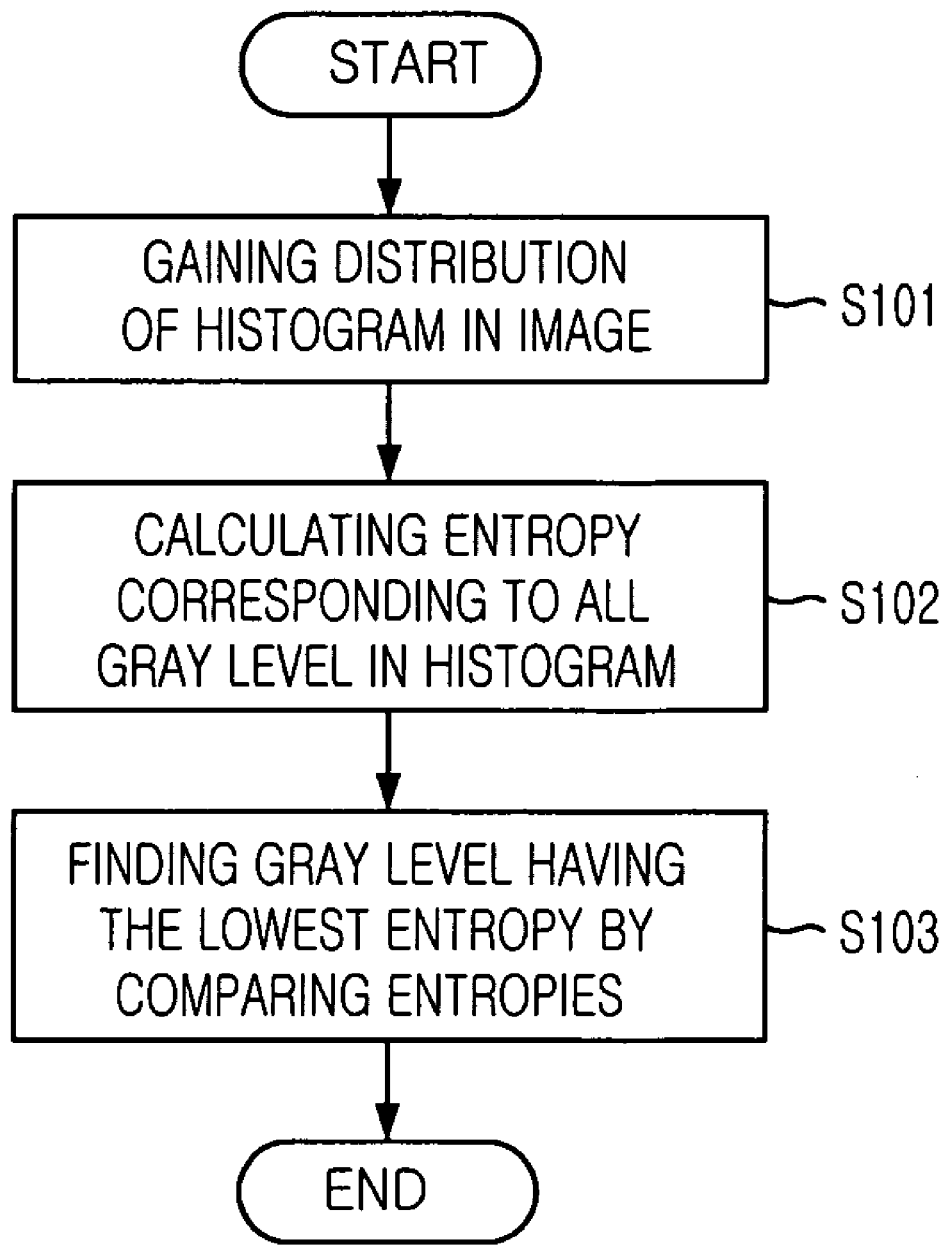
FIG. 1 is a flowchart explaining a conventional method for finding the optimal threshold.
Figure 2:
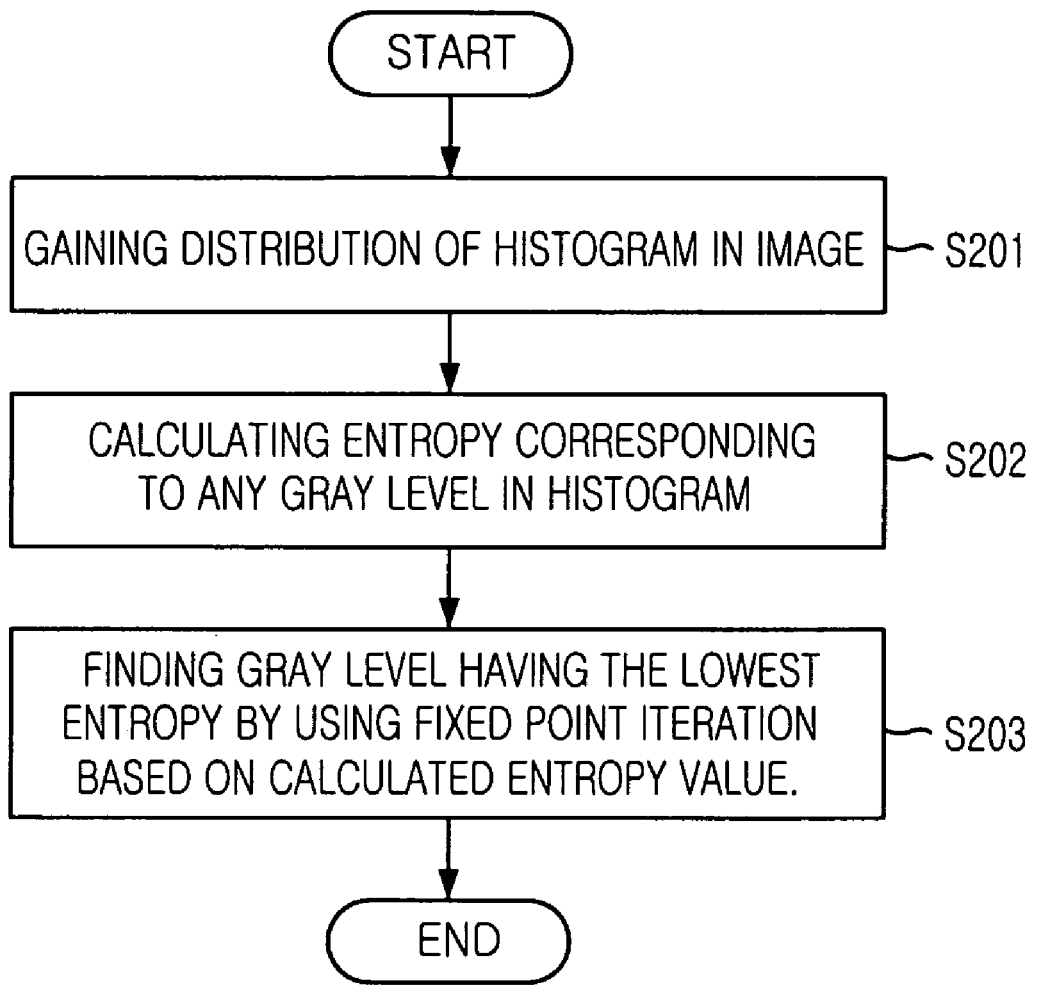
FIG. 2 is a flowchart for explaining a method for finding the optimal threshold for image segmentation in accordance with a preferred embodiment of the present invention.

FIG. 2 is a flowchart for explaining a method for finding the optimal threshold for image segmentation in accordance with a preferred embodiment of the present invention.

Referring to FIG. 2, a histogram distribution of an image is obtained at step 201. Entropies of gray levels are computed at step S202. After computing entropy value at step S202, a gray level of minimum entropy is gained by using the fixed point iteration (FPI) based on the computed entropy value at step S203.

In the step S202, the entropy of the gray level is computed by measuring fuzzy entropy of corresponding gray level. Hereinafter, the computation of fuzzy entropy is explained in detail.

If there is an M×N size of image I having L gray levels, a gray level of pixel (x,y) is defined as I(x,y) and $\mu_1(I_{i,j})$ represents fuzziness of gray scale of pixel (x,y). Therefore, the image I can be expressed as following equation.

$$I = \{(I_{ij}, \mu_1(I_{ij}))\}, \quad \text{Eq. 1}$$

wherein $0 \leq \mu_1(I_{i,j}) \leq 1$; $i=0, 1, \ldots, M-1$; $j=0, 1, \ldots, N-1$ If a gray level g has a frequency of generation h(g) in entire image I then an average gray level $\mu_0$ of a background can be expressed as following equation 2 and an average gray level $\mu_1$ of an object can be expressed as following equation 3.

$$\mu_0 = \sum_{g=0}^{T} gh(g) \bigg/ \sum_{g=0}^{T} h(g); \text{ if } i(x, y) \leq T \quad \text{Eq. 2}$$

$$\mu_1 = \sum_{g=T+1}^{T} gh(g) \bigg/ \sum_{T+1=0}^{L-1} h(g); \text{ if } i(x, y) \leq T \quad \text{Eq. 3}$$

The average gray levels $\mu_1$ and $\mu_0$ can be considered as target values of the threshold value T. That is, the fuzziness can be expressed as a difference between gray level of a pixel (x,y) and a gray level of a region including the corresponding gray level. Therefore, the difference of gray levels is smaller, as larger as the fuzziness is. Gray levels of all pixels in an image for a threshold T must have certain fuzziness either to an object or background. The fuzziness of a pixel can be expressed as following equation.

$$\mu_1(I_{ij}) = \begin{cases} \dfrac{1}{1+|i(x,y)-\mu_0|/k} & \text{if } i(x,y) \le T \\ \dfrac{1}{1+|i(x,y)-\mu_1|/k} & \text{if } i(x,y) > T \end{cases} \quad \text{Eq. 4}$$

Figure 3:
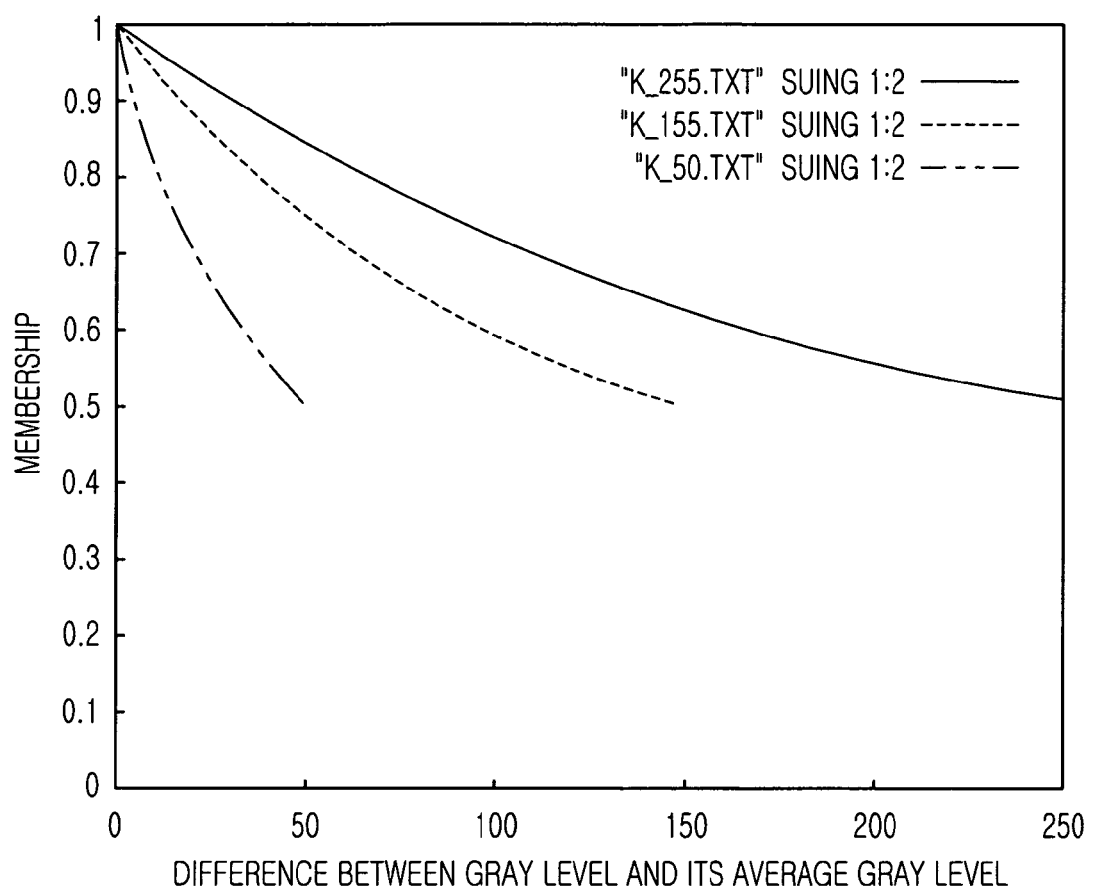
FIG. 3 is a graph showing a fuzziness according to a constant k in accordance with a preferred embodiment of the present invention.

In a meantime, when a gray level of a certain pixel is included in a specific region, the fuzziness must to be more than 0.5 to a corresponding set. Therefore, a constant K is defined as $G_{max}-G_{min}$ and the fuzziness is selected between 0.5 to 1. FIG. 3 shows fuzziness according to the constant K.

Also, fuzziness can be generally considered as a fuzziness of fuzzy set and there are various entropy-equations disclosed for computing fuzzy entropy. If the entropy equation of one independent variable is expanded to 2 dimensional image region then entropies of the image I can be expressed as following table 1.

TABLE 1

| Entropy type | Entropy Measures |
|---|---|
| Shannon | $E(j) = \dfrac{1}{MN\ln(2)}\sum_x\sum_y S(\mu_I(i(x,y)))$ <br> $S(\mu_I(i(x,y))) = -\mu_I(i(x,y))\cdot \ln(\mu_I(i(x,y))) -$ <br> $[1-\mu_I(i(x,y))]\cdot[\ln(1-\mu_I(i(x,y)))]$ |
| Yager | $E(J) = 1 - \dfrac{1}{(MN)^{1/\alpha}}\left\{\sum_x\sum_y S(\mu_I(i(x,y)))^\alpha\right\}^{1/\alpha}$, <br> $S(\mu_I(i(x,y))) = \mu_I(i(x,y)) - \overline{\mu_I}(i(x,y))$, <br> where $\alpha$ is a fuzzifier factor |
| Pal & Pal | $E(J) = \dfrac{1}{MN\ln(2)}\sum_x\sum_y S(\mu_I(i(x,y)))$, <br> $S(\mu_I(i(x,y))) = \mu_I(i(x,y))\cdot\exp[\mu_I(i(x,y))] +$ <br> $\{[1+\mu_I(i(x,y))]\cdot\exp[1+\mu_I(i(x,y))]\}$ |
| Bhandari | $E(J) = \dfrac{1}{MN\ln(2)(1-\alpha)}\sum_x\sum_y S(\mu_I(i(x,y)))$, <br> $S(\mu_I(i(x,y))) = \log[\mu_I(i(x,y))^\alpha + (1-\mu_I(i(x,y))^\alpha]$ |
| Standard Fuzzy Complement | $E(J) = \dfrac{1}{MN}\sum_x\sum_y S(\mu_I(i(x,y)))$, <br> $S(\mu_I(i(x,y))) = 1 - [2\mu_I(i(x,y)) - 1]$ |
| Kaufmann | $E(J) = \dfrac{2}{MN}\sum_x\sum_y S(\mu_I(i(x,y)))$, <br> $S(\mu_I(i(x,y))) = \min\{\mu_I(i(x,y)), 1-\mu_I(i(x,y))\}$ |
| Quadratic Kaufmann | $E(J) = \dfrac{2}{\sqrt{MN}}\left\{\sum_x\sum_y S(\mu_I(i(x,y)))\right\}^{1/2}$, <br> $S(\mu_I(i(x,y))) = \min\{\mu_I(i(x,y)), 1-\mu_I(i(x,y))\}^2$ |

Specially, the absolute value of entropy is increased in a range of [0, 0.5] and the value of entropy is decreased in a region of [0.5, 1]. In a meantime, if fuzziness of all gray level included in the image are about 0.5 then entropy E(I) has 1 as the maximum value.

After obtaining entropy values at step S202, a gray level of minimum entropy is obtained by using a fixed point iteration (FPI) method at step S203.

Figure 4:
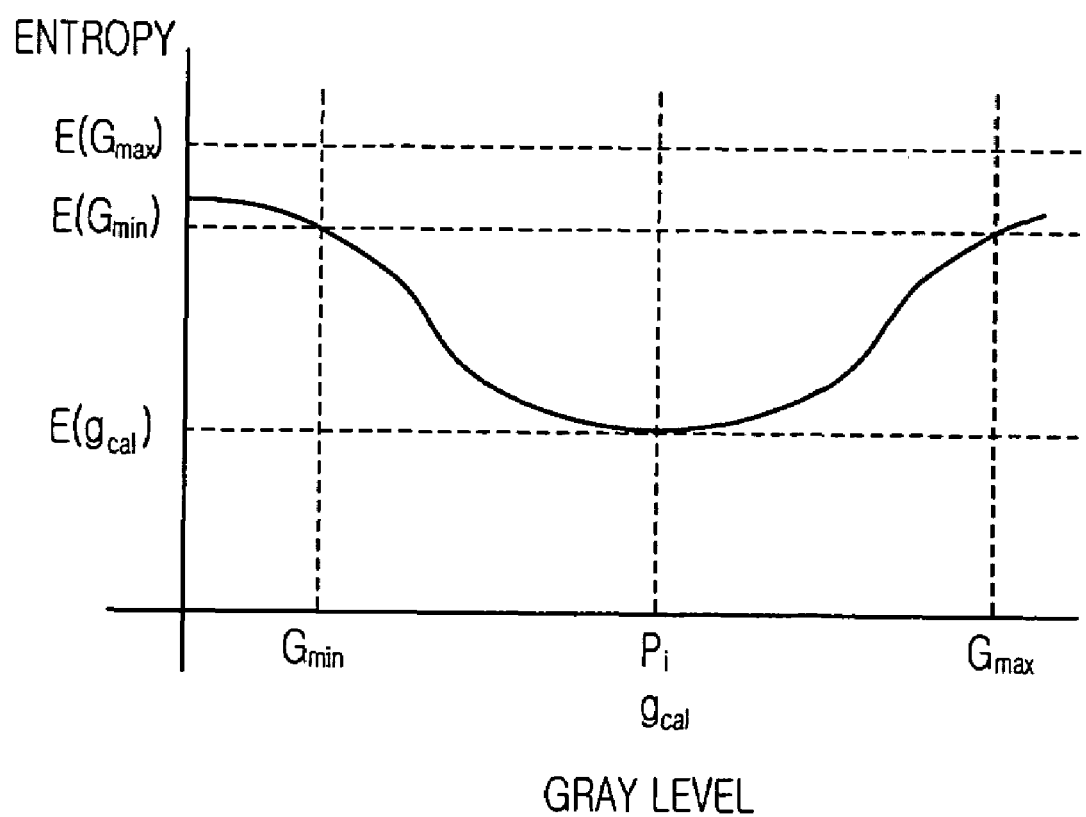
FIG. 4 is a graph showing gray level distribution curve for obtaining a gray level of minimum entropy in accordance with a preferred embodiment of the present invention.

FIG. 4 is a graph showing gray level distribution curve for obtaining a gray level of minimum entropy in accordance with a preferred embodiment of the present invention.

Referring to FIG. 4, obtaining a gray level of minimum entropy is explained hereinafter.

Figure 5:
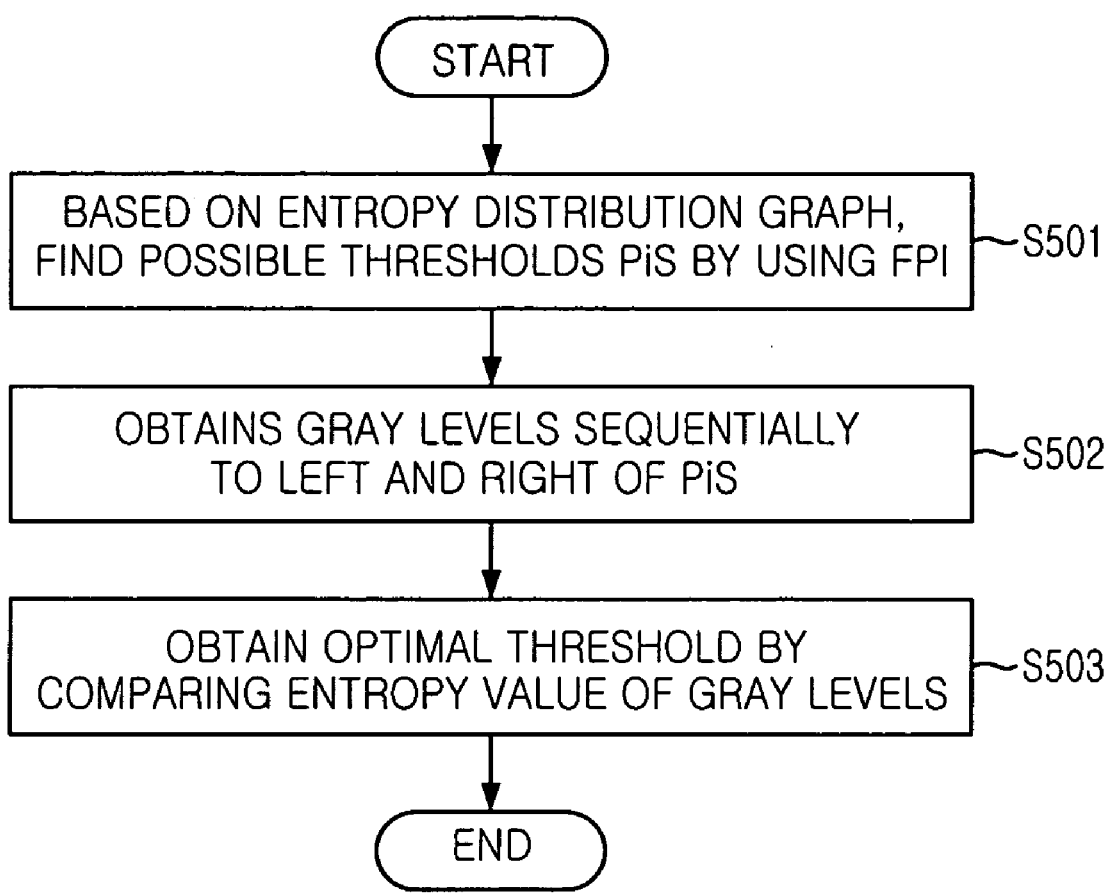
FIG. 5 is a flowchart for explaining the step S203 in FIG. 2 for gaining a gray level corresponding to the minimum entropy by using FPI in accordance with a preferred embodiment of the present invention.

FIG. 5 is a flowchart for explaining the step S203 in FIG. 2 for gaining a gray level corresponding to the minimum entropy by using FPI in accordance with a preferred embodiment of the present invention.

At step 501, possible optimal threshold values $P_i$ for obtaining a gray level of minimum entropy are obtained based on the graph of FIG. 4.

After obtaining the $P_i$, gray levels are sequentially obtained from left to right $P_i$.

At step 503, an optimal threshold of gray level having minimum entropy is obtained by comparing entropy values of gray levels of $P_i$.

Figure 6:
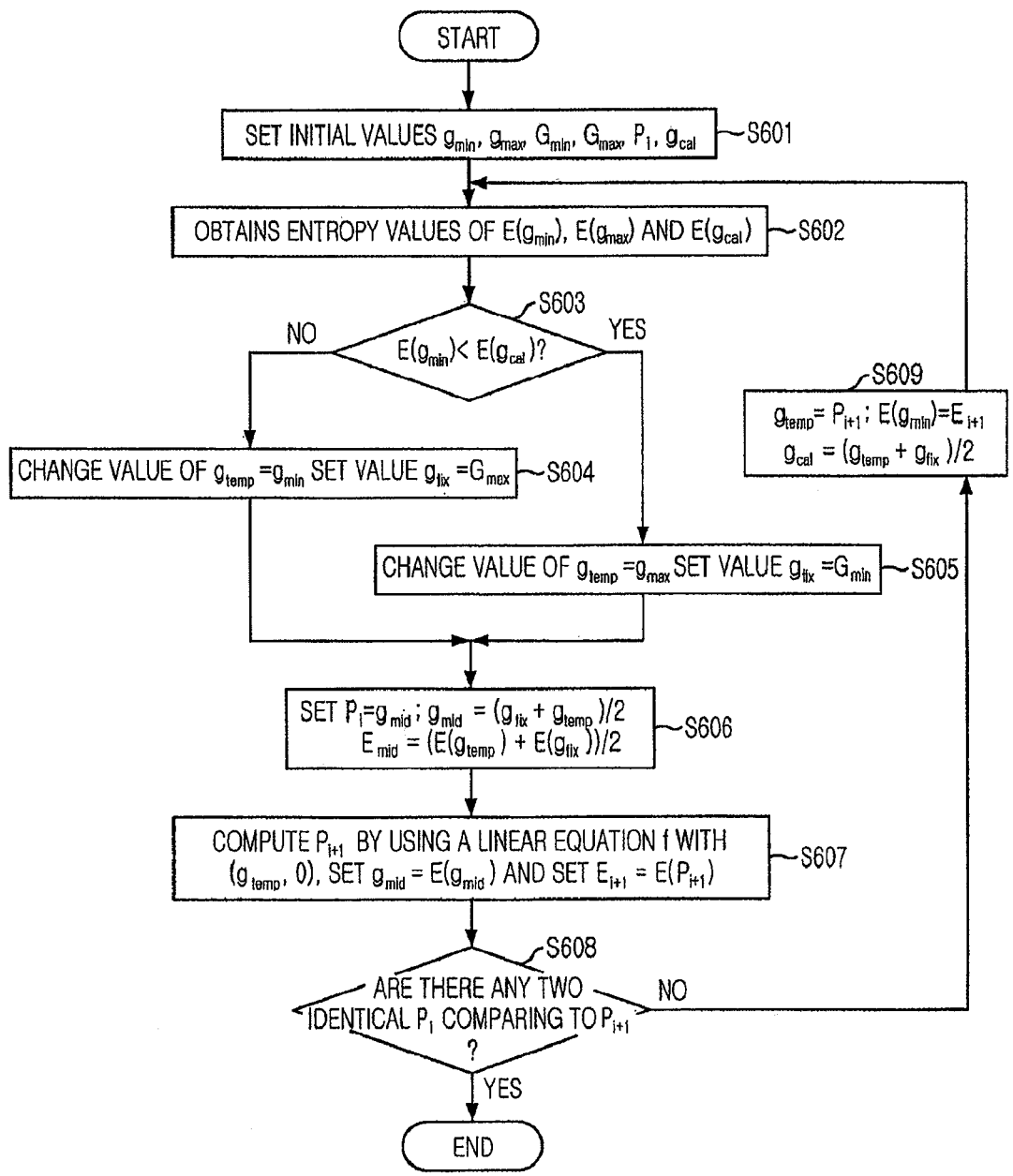
FIG. 6 is a flowchart for explaining step 501 of FIG. 5 in detail.

FIG. 6 is a flowchart for explaining step 501 of FIG. 5 in detail.

Referring to FIG. 6 and, at step 601, initial values of $g_{min}$, $g_{max}$, $G_{min}$, $G_{max}$, Pi and $g_{cal}$ are set as follows. $g_{min}$ is set as possible minimum gray level by selecting a lowest value of a gray level distribution curve on FIG. 4, and $g_{max}$ is set as possible maximum gray level by selecting a highest value of a gray level distribution curve on FIG. 4. And $G_{max}$ is set as equal to $g_{max}$ and $G_{min}$ is set as equal to $g_{min}$. Also, $P_i$ is set to mid point of $g_{max}$ and $g_{min}$ as $(g_{max}+g_{min})/2$.

Furthermore, $g_{cal}$ is set as equal to $P_i$. After initializing initial values, at step 602, entropy values $E(g_{min})$, $E(g_{max})$ and $E(g_{cal})$ of $g_{min}$, $g_{max}$ and $g_{cal}$ are computed.

After computing entropy values $E(g_{min})$, $E(g_{max})$ and $E(g_{cal})$, $E(g_{min})$ and $E(g_{max})$ are compared at step 603.

If $E(g_{min})$ is higher than $E(g_{cal})$, the value of $g_{temp}$ is changed to the value of $g_{min}$ and the value of $g_{fix}$ is set to $G_{max}$ at step 604. By changing values and not influencing to value of $G_{max}$ and $G_{min}$, new temporal values $g_{temp}$ and $g_{fix}$ are set as follows at step 604.

If $E(g_{min})$ is equal or less than $E(g_{cal})$, the value of $g_{temp}$ is changed to the value of $g_{max}$ and the value of $g_{fix}$ is set to $G_{min}$ at step 605. By changing values and not influencing to value of $G_{max}$ and $G_{min}$, new temporal values $g_{temp}$ and $g_{fix}$ are set as follows at step 605.

After changing value of $g_{temp}$ or $g_{fix}$ according to the comparison result and $P_i$ is set to $g_{mid}$, $g_{mid}$ is computed by $(g_{fix}+g_{temp})/2$ and $E_{mid}$ is computed by $(E(g_{temp})+E(g_{fix}))/2$ at step 606.

At step 607, $P_{i+1}$ is computed by using a linear equation f with $(g_{temp},0)$ and $(g_{mid},E(g_{mid}))$ and $E_{i+1}$ is set to $E(P_{i+1})$. The linear equation f is $f(g)=ag+b$.

After computing $P_{i+1}$, it is compared with any two of previous $P_i$ at step 608.

At step 609, if there are identical two $P_i$s, it is ended, and at step 610, if there are not identical two $P_i$s, $g_{temp}$ is set to $P_{i+1}$ and $g_{cal}$ is newly determined by $(g_{temp}+g_{fix})/2$, $E(g_{min})$ is set to $E_{i+1}$ and $g_{temp}$ is set to $P_{i+1}$. After setting new value for $g_{cal}$, steps 602 and 608 are repeatedly performed. For helping to understand steps for obtaining optimal threshold of FIG. 6, pseudo code is shown in below table.

TABLE 2

```
Set flag=True;
Set g_min = possible minimum occurring gray level;
Set g_max = possible maximum occurring gray level;
Set G_min = g_min;
Set G_max = g_max;
Set P_i = int [(g_max+g_min)/2];
set g_cal = P_i;
Compute E(g_min);
Compute E(g_max);
Compute E(g_cal);
While (flage == True)
    if (E(g_cal) < E(g_min)) then
        set g_temp = g_min;
        set g_fix = G_max;
    Else
        set g_temp = g_max;
        set g_fix = G_min;
    Set g_mid = (g_fix + g_temp)/2;
    Set P_i = g_mid;
    Set E_mid = (E(g_temp) + E(g_fix))/2;
    Generate linear equation f using (g_temp,0) and (g_mid, E_mid);
    Set P_{i+1} = f^{-1} (E(P_i)); Set E_{i+1} = E(P_{i+1});
        If (P_{i+1} = any two previous P_i) then
            set flag = false;
        Else
            set E(g_min) = E_{i+1};
            set g_temp = P_{i+1}, g_cal = (g_temp + g_fix)/2;
        END IF
End While.
```

As mentioned above, the present invention can quickly find the optimal threshold value by analyzing entropy characteristic of image based on a segmentation completion condition and a fixed point iteration.

While the present invention has been described with respect to certain preferred embodiments, it will be apparent to those skilled in the art that various changes and modifications may be made without departing from the scope of the invention as defined in the following claims.

What is claimed is:

1. A method for finding a threshold value in image segmentation, the method comprising the steps of:
   a) gaining histogram distribution of an image;
   b) computing entropy values corresponding to gray levels in the histogram; and
   c) gaining a minimum entropy value corresponding to the gray level as the threshold value by using a fixed point interation FPI based on the computed entropy values, wherein the step c) includes the steps of:
      c-1) obtaining a plurality of possible optimal thresholds,
      c-2) obtaining entropy values of gray levels corresponding to the obtained possible optimal thresholds, and
      c-3) obtaining the threshold value by comparing entropy values and selecting minimum entropy value,
   wherein each of the possible optimal thresholds is obtained by obtaining a value of possible maximum gray level having maximum entropy value, a value of possible minimum gray level having minimum entropy value and obtaining possible optimal threshold by adding two values of the possible maximum gray level and the possible minimum gray level and dividing the sum of addition by half.

2. The method as recited in claim 1, wherein the possible optimal thresholds are obtained by changing one of the value of the possible maximum gray level and the value of the possible minimum gray level according to comparison of entropy values of the possible maximum gray level, the possible minimum gray level and obtained optimal threshold and by newly obtaining a possible optimal threshold based on the changed values of the possible maximum gray level and the value of the possible minimum gray level.

3. A method for finding a threshold value in image segmentation, the method comprising the steps of:
   a) gaining histogram distribution of an image;
   b) computing entropy values corresponding to gray levels in the histogram; and
   c) gaining a minimum entropy value corresponding to the gray level as the threshold value by using a fixed point interation FPI based on the computed entropy values, wherein the step c) includes the steps of:
      c-1) obtaining a plurality of possible optimal thresholds,
      c-2) obtaining entropy values of gray levels corresponding to the obtained possible optimal thresholds, and
      c-3) obtaining the threshold value by comparing entropy values and selecting minimum entropy value, wherein the step c-1) includes the steps of:
      c-i) obtaining an initial possible optimal threshold, an initial possible maximum gray level having maximum entropy value and an initial possible minimum gray level having minimum entropy value by setting $G_{min}$ to have the initial possible minimum gray level, setting $G_{max}$ to have the initial possible maximum gray level, setting $g_{min}$ and $g_{max}$ to have identical values $G_{min}$ and $G_{max}$, respectively for not influencing change of value of $G_{min}$ and $G_{max}$, setting $P_i$ to have the initial possible optima threshold by computing equation $P_i=((g_{min}+g_{max})/2)$ and setting $g_{cal}$ to have the identical value of $P_i$;
      c-ii) obtaining entropy values $E(g_{min})$, $E(g_{max})$ and $E(g_{cal})$ of $g_{min}$, $g_{max}$, and $g_{cal}$;
      c-iii) comparing $E(g_{min})$ and $E(g_{cal})$;
      c-iv) if $E(g_{min})$ is higher than $E(g_{cal})$ as a result of comparison of step c-iii), changing the value of $g_{min}$ to have the value of $g_{cal}$ and not changing the value of $g_{max}$ by setting a value of $g_{temp}$ to have the value of $g_{min}$ and setting a value of $g_{fix}$ to have the value of $G_{max}$;
      c-v) if $E(g_{min})$ is equal or less than $E(g_{cal})$ as a result of comparison of step c-iii), changing the value of $g_{max}$ to have the value of $g_{cal}$ and not changing the value of $g_{min}$ by setting a value of $g_{temp}$ to have the value of $g_{max}$ and setting a value of $g_{fix}$ to have the value of $G_{min}$;
      c-vi) obtaining new possible optimal threshold $P_i$ based on changed value of $g_{min}$ and $g_{max}$ by an equation as: $P_i=(g_{fix}+g_{temp})/2$;
      c-vii) obtaining $P_{i+1}$ by using a linear equation f with $(g_{temp}, 0)$, wherein the f is $f(g)=ag+b$, $a=g_{temp}$ and b is 0 and by equation as $P_{i+1}=f^{-1}(E(P_i))$;
      c-viii) comparing $P_{i+1}$ with previously obtained $P_i$s;
      c-ix) if there are not identical two $P_i$s, determining next possible optimal threshold by setting $g_{temp}$ to have the value of $P_{i+1}$ and setting $g_{cal}$ to have a value of $(g_{temp}+g_{fix})/2$, and repeatedly performing steps c-ii) to c-viii); and
      c-x) if there are identical any two $P_i$s, selects the threshold value by comparing entropy values of corresponding $P_i$s and selecting $P_i$ having minimum entropy value as the threshold value.

* * * * *